`US008094538B2`

(12) United States Patent
Lee et al.

(10) Patent No.: US 8,094,538 B2
(45) Date of Patent: Jan. 10, 2012

(54) DATA RECORDING METHOD IN HOLOGRAPHY OPTICAL MEMORY SYSTEM

(75) Inventors: Yeon-Ho Lee, Gyeonggi-do (KR); Jong-Su Yi, Gyeonggi-do (KR)

(73) Assignee: Sungkyunkwan University Foundation For Corporate Collaboration, Gyeonggi-Do (KR)

( * ) Notice: Subject to any disclaimer, the term of this patent is extended or adjusted under 35 U.S.C. 154(b) by 370 days.

(21) Appl. No.: 12/393,841

(22) Filed: Feb. 26, 2009

(65) Prior Publication Data

US 2010/0202269 A1 Aug. 12, 2010

(30) Foreign Application Priority Data

Feb. 12, 2009 (KR) .................. 10-2009-0011265

(51) Int. Cl.
*G11B 7/00* (2006.01)
(52) U.S. Cl. ........................................................ 369/103
(58) Field of Classification Search .................. 369/103
See application file for complete search history.

(56) References Cited

U.S. PATENT DOCUMENTS

| 2006/0158988 A1* | 7/2006 | Uchida ....................... 369/103 |
| 2007/0008598 A1* | 1/2007 | Tsukagoshi et al. ............. 359/9 |
| 2008/0165653 A1* | 7/2008 | Hwang et al. ................ 369/103 |

OTHER PUBLICATIONS

Office Action dated Jul. 24, 2010 for corresponding Korean Patent Application No. 10-2009-0011265.

* cited by examiner

*Primary Examiner* — Joseph Haley
*Assistant Examiner* — Nicholas Lee
(74) *Attorney, Agent, or Firm* — James P. Muraff; Neal, Gerber & Eisenberg LLP

(57) ABSTRACT

According to an aspect of the present invention, a data recording method in a holography optical memory system, for recording a two-dimensional pixel data page in a recording medium can be provided. In accordance with an embodiment of the present invention, the data recording method in a holography optical memory system can include recording sequentially the signal beams carrying one-dimensional pixel data lines, included in the original two dimensional pixel data page, in the recording medium by using the same reference beam. Here, the pixel data page can be recorded such that any two adjacent pixel data lines are partially overlapped with each other in an area of the recording medium.

11 Claims, 12 Drawing Sheets

Restored data page

Recording medium

Reference beam

C1 C2 C3 C4 C5

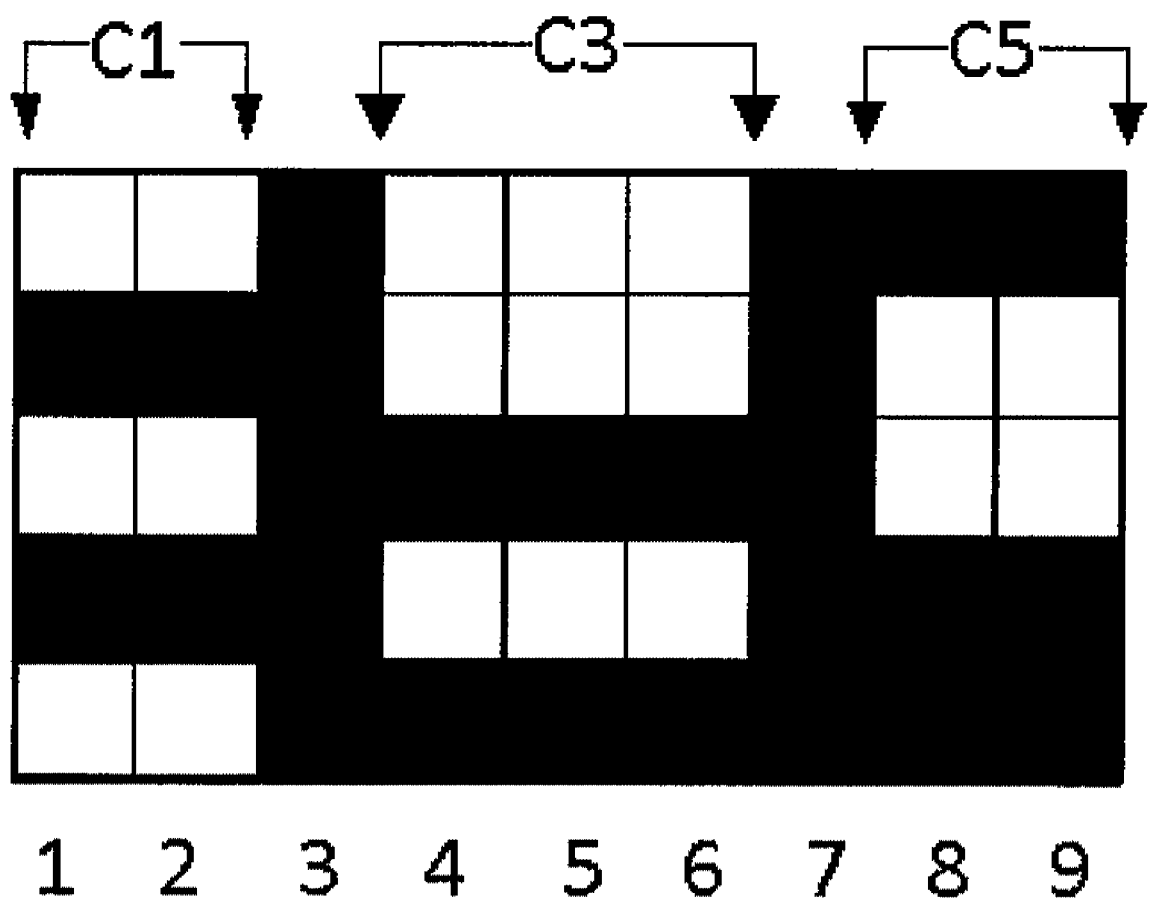

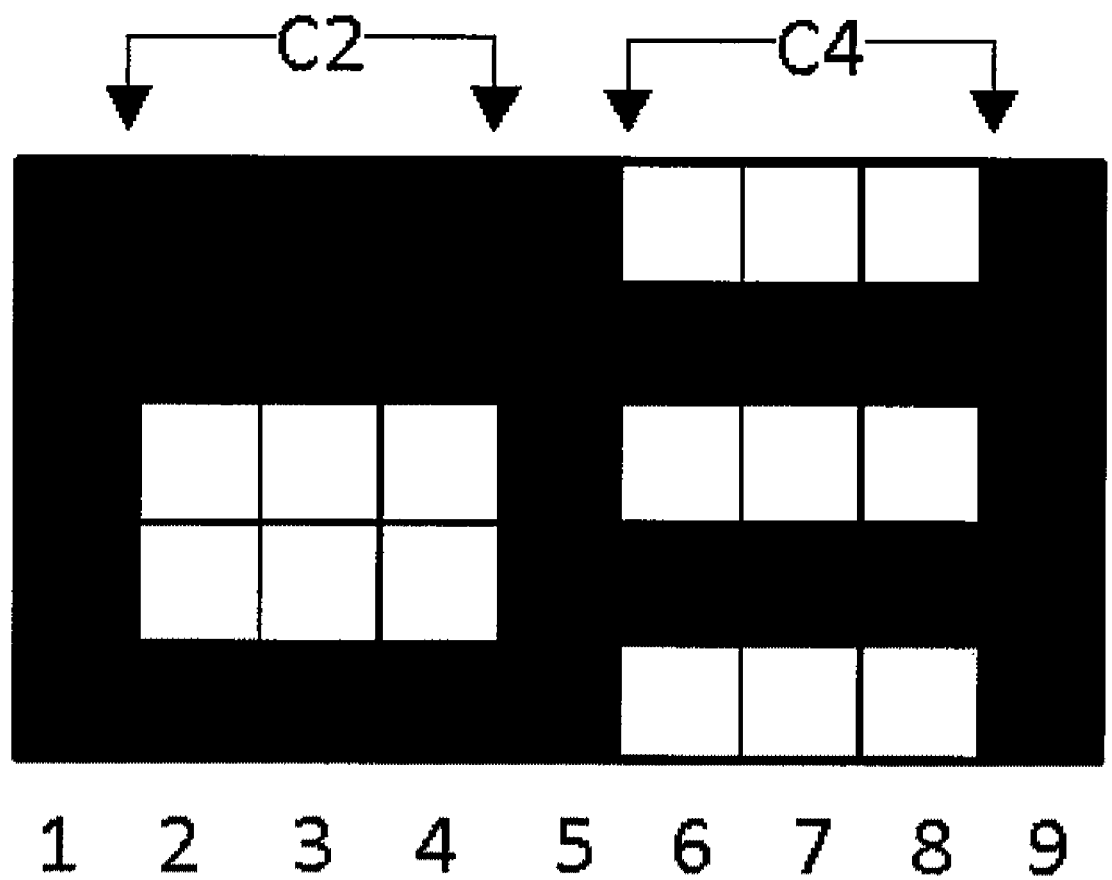

FIG. 5

|   | 1 | 2 | 3 | 4 | 5 |
|---|---|---|---|---|---|
| 1 | D11 | D12 | D13 | D14 | D15 |
| 2 | D21 | D22 | D23 | D24 | D25 |
| 3 | D31 | D32 | D33 | D34 | D35 |
| 4 | D41 | D42 | D43 | D44 | D45 |
| 5 | D51 | D52 | D53 | D54 | D55 |

|   | 1 | 2 | 3 | 4 | 5 |
|---|---|---|---|---|---|
| 1 | 1 | 0 | 1 | 1 | 0 |
| 2 | 0 | 0 | 1 | 0 | 1 |
| 3 | 1 | 1 | 0 | 1 | 1 |
| 4 | 0 | 1 | 1 | 0 | 0 |
| 5 | 1 | 0 | 0 | 1 | 0 |

|   | 1 | 2 | 3 | 4 | 5 | 6 | 7 | 8 | 9 |
|---|---|---|---|---|---|---|---|---|---|
| 1 | 1 | 1 | 0 | 1 | 1 | 1 | 0 | 0 | 0 |
| 2 | 1 | X | 0 | X | 1 | X | 0 | X | 0 |
| 3 | 0 | 0 | 0 | 0 | 0 | 0 | 0 | 0 | 0 |
| 4 | 1 | X | 0 | X | 0 | X | 0 | X | 1 |
| 5 | 1 | 1 | 0 | 0 | 0 | 0 | 0 | 1 | 1 |
| 6 | 1 | X | 1 | X | 0 | X | 0 | X | 1 |
| 7 | 0 | 1 | 1 | 1 | 0 | 0 | 0 | 0 | 0 |
| 8 | 1 | X | 1 | X | 0 | X | 0 | X | 0 |
| 9 | 1 | 1 | 0 | 0 | 0 | 0 | 0 | 0 | 0 |

| | 1 | 2 | 3 | 4 | 5 | 6 | 7 | 8 | 9 |
|---|---|---|---|---|---|---|---|---|---|
| 1 | 0 | 0 | 0 | 0 | 0 | 1 | 1 | 1 | 0 |
| 2 | 0 | X | 0 | X | 1 | X | 1 | X | 1 |
| 3 | 0 | 0 | 0 | 1 | 1 | 1 | 0 | 1 | 1 |
| 4 | 0 | X | 1 | X | 1 | X | 1 | X | 1 |
| 5 | 0 | 1 | 1 | 1 | 0 | 1 | 1 | 1 | 0 |
| 6 | 0 | X | 1 | X | 1 | X | 1 | X | 0 |
| 7 | 0 | 0 | 0 | 1 | 1 | 1 | 0 | 0 | 0 |
| 8 | 0 | X | 0 | X | 1 | X | 1 | X | 0 |
| 9 | 0 | 0 | 0 | 0 | 0 | 1 | 1 | 1 | 0 |

DATA RECORDING METHOD IN HOLOGRAPHY OPTICAL MEMORY SYSTEM

CROSS-REFERENCE TO RELATED APPLICATIONS

This application claims the benefit of Korean Patent Application No. 10-2009-0011265, filed with the Korean Intellectual Property Office on Feb. 12, 2009, the disclosure of which is incorporated herein by reference in its entirety.

BACKGROUND

1. Technical Field

The present invention relates to an optical memory system, more specifically to a data recording method in a holography optical memory system.

2. Description of the Related Art

Nowadays, the optical discs have widely been popular as data-recording mediums. The optical discs require the technology that can decrease the diameter of a beam spot to increase the recording density and decrease the distance between adjacent tracks or adjacent bits. The recording density of the optical disc, however, has recently reached the physical limitation due to the diffraction of light.

Accordingly, the holography optical memory has come into the spotlight as the next-generation memory for replacing recording mediums such as optical discs. The holography optical memory features high capacity attributed to 3-dimensional multi-recording and high speed attributed to 2-dimensional batch-recording and reproducing. Described below is the method of recording and reproducing data in the holography optical memory.

Firstly, if a signal beam, corresponding to data which will be recorded in the recording medium such as photorefractive crystal or photo polymer, and a reference beam cross each other, an interference pattern according to the interference between the two beams is formed and recorded as the change of the refractive index. Later, it is possible to reproduce (or restore) the recorded data by illuminating the recording medium with the reference beam only.

However, there may be some errors in the process of recording and reproducing data in the holography optical memory system. This may yield disadvantageous effects on the precision and reliability of the memory system.

In accordance with the conventional art, there has been an attempt to solve the above problem by creating an additional error-correcting code such as the Reed Solomon code and then storing the error-correcting code in the recording medium together. The conventional art, however, requires complex pre-treatment processes for creating the error-correcting code and an additional device for encoding the error-correcting code.

BRIEF DESCRIPTION OF THE DRAWINGS

FIG. 3A through FIG. 3D show how data is recorded in a holography optical memory system in accordance with another embodiment of the present invention;

FIG. 5 shows a two-dimensional data page with matrix elements and a 5×5 matrix-type data page having pixel data values shown in FIG. 3A;

SUMMARY

Figure 1:
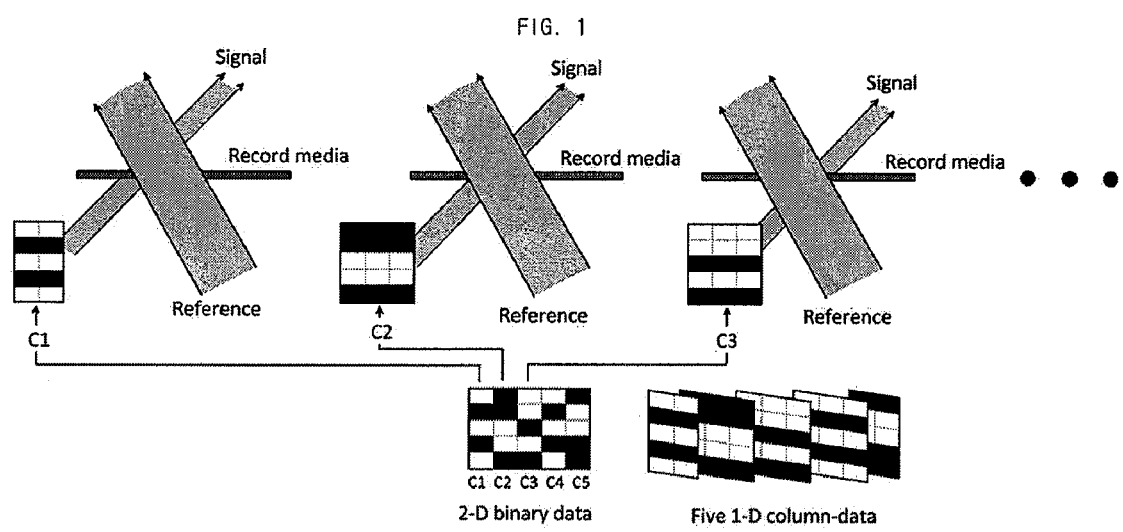
FIG. 1 shows how data is recorded in a holography optical memory system in accordance with an embodiment of the present invention.

The present invention provides a data recording method in a holography optical memory system that can simply check whether there are errors in the process of recording and reproducing data without a complex pre-treatment process for creating an error-correcting code.

Other problems that the present invention can solve will become more apparent through the following description.

An aspect of present invention features a data recording method in a holography optical memory system, to record a two-dimensional pixel data page in a recording medium In accordance with an embodiment of the present invention, the data recording method in the holography optical memory system can include recording sequentially signal beams carrying one-dimensional pixel data lines, included in the two-dimensional pixel data page, in the recording medium by using a reference beam. Here, the pixel data page can be recorded such that two adjacent pixel data lines are partially overlapped with each other in an area of the recording medium.

Here, if the pixel data page has an M×N matrix shape, where M and N are natural numbers equal to or greater than 2 representing M rows and N columns, the one-dimensional pixel data lines can be M rows having N pixel data in a row or N columns having M pixel data in a column.

An overall recorded area of the recording medium can be distinguished into a non-overlapped-recorded-area and an overlapped-recorded-area, located between the non-overlapped-recorded-areas, respectively. Here, original data corresponding to each of the pixel data line can be recorded in the non-overlapped-recorded-area, and parity data formed by an overlapping, made between two signal beams corresponding to the adjacent pixel data lines, can be recorded in the overlapped-recorded-area.

If original pixel data of the pixel data page has a binary value that is distinguished as "1" and "0" according to light intensities, the parity data can be represented by a ternary value according to light intensities.

In accordance with another embodiment of the present invention, a data recording method in a holography optical memory system can include dividing one-dimensional pixel data lines included in the pixel data page into two groups and reconfiguring the pixel data lines in two sub data pages such that pixel data lines of a same group is arranged in a same sub data page; and recording sequentially two signal beams corresponding to each sub data page in the recording medium by using a reference beam such that the adjacent pixel data lines are partially overlapped with each other in an area of the recording medium.

Here, if the pixel data page has an M×N matrix shape, where M and N are natural numbers equal to or greater than 2 representing M rows and N columns, the one-dimensional pixel data lines can be M rows having N pixel data in the horizontal direction or N columns having M pixel data in the vertical direction.

The partially-overlapped pixel data lines can be sorted into two groups that are arranged in two separate sub data pages.

The pixel data lines can be divided into divided into two groups, a first group having odd-numbered lines and a second group having even-numbered lines, and separately inserted into two separate sub data pages.

The two sub data pages can have the same page size, and the pixel data lines can be arranged in two sub data pages such that there exist overlapped-column-data formed in an area where two adjacent pixel data lines are overlapped with each other, and non-overlapped-column-data formed in an area where a pixel data line is not overlapped with other pixel data lines when the two sub data pages are completely overlapped during recording.

A non-overlapped-column-data can be formed by an overlap between a pixel data line of one of sub data pages and a dummy-column-data of the other sub data page, which is a pixel column in the sub data page with predetermined dummy data.

The original pixel data can be recorded in the non-overlapped-column-data, which is formed by an overlap of the corresponding pixel data line in a sub data page with a dummy-column-data in the other sub data page, and parity data can be recorded in the overlapped-column-data, which is formed by a partial overlap of a pixel data line in a sub data page with another pixel data line in the other sub data page.

If the original pixel data in the pixel data page has a binary value that is distinguished as "1" and "0" according to light intensities, the parity data can be represented as a ternary value according to light intensities.

The modified non-overlapped-column-data, which is formed by an overlap between the corresponding pixel data line and the dummy-column-data that contains a predetermined pattern of binary values "0" and "1", can be represented by ternary values according to light intensities.

All the data values of the dummy-column-data can be given by "0".

In accordance with yet another embodiment of the present invention, a data recording method in a holography optical memory system can include dividing pixel data included in the pixel data page into two groups and reconfiguring the pixel data in two separate sub data pages such that pixel data of a same group are arranged in a same sub data page; and recording sequentially two signal beams corresponding to each sub data page in the recording medium by using a reference beam such that a pixel data is partially overlapped with adjacent multiple pixel data.

Here, the pixel data can be reconfigured in two sub data pages such that a pixel data in one sub data page is partially overlapped with other pixel data in the other sub data page when the two sub data pages are completely overlapped.

The pixel data page can have an M×N matrix shape, where M and N are natural numbers equal to or greater than 2, and the pixel data can be divided into two groups, a first group having the pixel data located at a ith row and a jth column with i+j being an odd number, and a second group having the pixel data located at a ith row and a jth column with i+j being an even number, and the two groups can be reconfigured in two separate sub data pages.

The two sub data pages can have same page size, and the pixel data can be grouped and reconfigured in the two sub data pages such that there exist overlapped-pixel-data formed in an area where a pixel data is overlapped with adjacent another pixel data, non-overlapped-pixel-data formed in an area where a pixel data is not overlapped with other pixel data, and unused-pixel-data formed in an area where no pixel data is involved, or unused pixels of the two sub data pages are overlapped, when the two sub data pages are overlapped completely.

Predetermined dummy data can be inserted in the unused pixel of the two sub data pages.

The non-overlapped-pixel-data can be formed by an overlap of a pixel data in one sub data page with an unused pixel having the dummy data in the other sub data page.

The recording medium can be distinguished into two areas to which the overlapped-pixel-data and the non-overlapped-pixel-data are stored, respectively, and modified pixel data can be contained in the non-overlapped-pixel-data, which is formed by an overlap between the corresponding pixel data and the unused pixel with dummy data, and parity data can be contained in the overlapped-pixel-data, which is formed by a partial overlap between two pixel data.

If the original pixel data of the pixel data page has a binary value that is distinguished as "1" and "0" according to light intensities, the parity data can be represented by a ternary value according to light intensities.

The dummy data can has binary values distinguished as "0" and "1" according to light intensities, and the modified pixel data contained in the non-overlapped-pixel-data can be represented by ternary values.

All data values of the dummy data are "0."

A pixel data can be reconfigured in the shape of a cross in the corresponding sub data page such that the same data value is copied to five pixels: the center and the four neighboring pixels that are the left, right, upper and lower pixel, and different pixel data having a cross shape can be arranged not to be overlapped in the same sub data page.

Reconfigured pixel data can have the shape of a broken cross at the edge or the corner of the sub data page.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Described below are three embodiments of the present invention describing a data recoding method in a holography optical memory system, by which a two-dimensional pixel data page is recorded in a recording medium as a hologram. However, many other embodiments that can be realized or modified according to the same principle can be included in the scope of claims of the present invention.

Throughout the description of the present invention, when describing a certain technology is determined to evade the point of the present invention, the pertinent detailed description will be omitted. Terms such as "first" and "second" can be used in describing various elements, but the above elements shall not be restricted to the above terms. The above terms are used only to distinguish one element from the other.

Hereinafter, a data recoding method in a holography optical memory system in accordance with each embodiment of the present invention will be described in detail.

Figure 2:
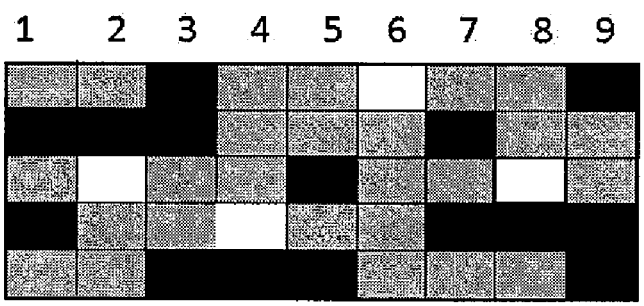
FIG. 2 shows an example of a data page restored from the data recorded by the data recording method shown in FIG. 1.

FIG. 1 shows how data is recorded in a holography optical memory system in accordance with an embodiment of the present invention, and FIG. 2 shows an example of a data page restored from the data recorded by the data recording method shown in FIG. 1.

In an embodiment of the present invention, shown in FIG. 1 and FIG. 2, the recording of a two-dimensional pixel data page in a recording medium can be fundamentally performed on the basis of the sequential recording of one-dimensional pixel data lines.

The terms, "pixel data page" and "pixel data line" which will be used throughout the description of the present invention are firstly defined as follows. A two-dimensional image can be formed by a two-dimensional array of pixels. Here, the pixel is the minimum unit for forming an image, or the minimum unit of optical pixels used to represent a digital data. At this time, the "pixel data page" refers to a two-dimensional array of pixel data, where "pixel data" is a digital data contained in a pixel. The "pixel data line" refers to a one-dimensional array of pixel data, which can be a row or a column in the pixel data page. Accordingly, if it is assumed that the pixel data page corresponding to the two-dimensional image has a M×N matrix-shape, where M and N are natural numbers equal to or greater than 2 representing M rows and N columns, respectively, the one-dimensional pixel data lines can be M rows having N pixel data a row or N columns having M pixel data in a column.

In some applications, an original two-dimensional image is displayed by sequentially displaying one-dimensional line images included in the two-dimensional image. Such sequential scanning method is popularly used for laser printers, projection TVs, projectors, scanning display apparatuses, etc.

For example, the sequential scanning method can be applied to a scanning display apparatus employing a one-dimensional optical modulator and a scanning mirror. When the optical modulator generates one-dimensional images corresponding to each column of a two-dimensional M×N matrix-type image, one at a time, the scanning mirror receives the one-dimensional images and projects and spreads them on a screen in the horizontal direction (i.e. the same direction as the horizontal direction of the two-dimensional image) to display the original two-dimensional image on a screen.

The basic principle of the aforementioned sequential scanning method can be applied to an embodiment of the present invention. For example, an image forming apparatus, such as an one-dimensional optical modulator, for forming a one-dimensional image, and a scanner, such as a galvanometer mirror scanner, a polygon mirror scanner, or a rotation bar, for sequential projection of the one-dimensional image, can be required as elements of an apparatus for recording data in accordance with an embodiment of the present invention.

In accordance with an embodiment of the present invention as shown FIG. 1 and FIG. 2, there are some differences, as compared with the aforementioned scanning display apparatus, which is that a hologram corresponding to a two-dimensional image (instead of the two-dimensional image itself) can be recorded (instead of being displayed) in a recording medium (instead of a screen).

The differences are resulted from such differently applied applications. That is, while the present invention is related to the holography optical memory system, the aforementioned example is related to the scanning display apparatus. Fundamentally, the basic principle of the sequential scanning method is not differently applied to the scanning display apparatus and the holography optical memory system.

Accordingly, the description related to the elements (e.g. a light source, an image forming apparatus, a scanner, etc.) of an apparatus for applying the basic principle of the aforementioned sequential scanning method to the present invention will be omitted. The description related to the elements of the holography optical memory system will be also omitted. This is because the present invention is based on a recording method showing how data is recorded in the existing holography optical memory system. The present invention does not feature the elements of the holography optical memory system.

Described below are main features of the data recording method in accordance with the embodiments of the present invention.

As described above, the data recording method in accordance with an embodiment of the present invention can be fundamentally based on the method of sequential scanning in which signal beams carrying different one-dimensional pixel data lines are sequentially recorded in a recording medium.

The sequential scanning method according to an embodiment of the present invention, however, is distinguished from the typical sequential scanning method. Such a difference is that two signal beams carrying two adjacent pixel data lines, respectively, are sequentially recorded such that the recorded pixel data lines are partially overlapped with each other in the recording medium.

In the typical sequential scanning method, the scanned positions are adjusted such that any two adjacent one-dimensional images are not overlapped with each other on the screen. This is because, if the overlapping is made between two one-dimensional images, the image distortion may be caused in the overlapped area, thereby making it difficult to reproduce the original two-dimensional image.

In accordance with an embodiment of the present invention, however, any two signal beams, carrying two adjacent one-dimensional pixel data lines of a two-dimensional pixel data page, can be recorded in the recording medium at different times and the two recorded pixel data lines can be made partially overlapped with each other, on purpose, in the recording medium. This is to use the information recorded at the overlapped area as a kind of parity bits for detecting and correcting the possible error that may arise in the data recording and/or restoring processes.

More detailed examples will be described below with reference to FIG. 1 and FIG. 2 for clearer understanding of the main features of the data recording method in accordance with an embodiment of the present invention.

As shown in FIG. 1, it is assumed that a 5×5 matrix pixel data page is recorded in the recording medium. Then, the pixel data page can have a total of five pixel data lines (refer to C1 through C5 in FIG. 1, and hereinafter referred to as "column data") in the horizontal direction.

At this time, the five column data C1 through C5 can be sequentially recorded as holograms in a recording medium according to a predetermined order of beam scanning. That is, the five column data C1 through C5 can be recorded in the recording medium according to the order of beam scanning, one at a time, for a total of five times.

FIG. 1 shows that five column data C1 through C5 of a two-dimensional binary data page are sequentially recorded in such order as the signal beam carrying column data C1 located at the first column, then the signal beam carrying column data C2 located at the second column, then the signal beam of column data C3, then the signal beam of column data C4, and then the signal beam of column data C5. However, it is not necessary that the order of beam scanning be identical to the column order in the pixel data page.

When the five column data C1 through C5 are recorded in sequence, each column data is recorded partially overlapped with adjacent column data in the recording medium. The partial overlappings are made between the column data C1 and C2, the column data C2 and C3, the column data C3 and C4, and the column data C4 and C5 (refer to the picture at the lower most right side in FIG. 1). In the above example, the order of recording the one-dimensional column data has been the same as the order of the columns in a two-dimensional pixel data page; C1 followed by C2, which is then followed by C3 and so on. However, the order of recording can be random regardless of the order of the columns in the data page; C3 followed by C1, which is then followed by C2 and so on, for example, only if each column data is recorded such that it partially overlaps with the adjacent column data. This is because the change of the refractive index generated by a signal beam, which carries an one-dimensional column data, together with the reference beam remains constant in the recording medium until next light is incident into the same area. When another column data is recorded partially overlapped with the previously recorded column data, the change of the refractive index in the overlapped area can be additive. In other words, when two adjacent bright pixels are partially overlapped, the amount of change of the refractive index in the overlapped area can be twice of that by a single bright pixel.

The sequential recording of one-dimensional column data with partial overlappings can be done by adequately adjusting various factors such as rotation angle, rotation speed, rotational direction and so on related to the scanning apparatus. This is because, once the recording area for a column data is determined, the rotation angle of a scanner can be also determined.

Because all the one-dimensional column data are recorded with the same reference beam, the recorded column data can be restored all at the same time by illuminating the recording medium with the reference beam. In other words, the recorded column data are restored in a two-dimensional data page in which column data are partially overlapped with the adjacent column data. In this case, a restored column data can consists of three regions: the central region containing the information of the original column data, two side overlapped regions. The central region and the two side overlap regions can be read by three different columns of photo detector such as CCD camera and two-dimensional array of photo diodes. Therefore, the lowest limit of the size of the overlapped area can be determined according to the resolution of the photo detector which will be used for the holography optical memory system.

When the 5×5 matrix-type data page shown in the lower middle part of FIG. 1 is recorded in the recording medium by the data recording method in accordance with an embodiment of the present invention, the restored two-dimensional data page is shown in FIG. 2.

As shown in FIG. 2, the restored data page can have a 5×9 matrix shape. This is because four additional column data (the second, the fourth, the sixth and the eighth columns) appear in the restored data page, which result from the partial overlapping of adjacent data columns: partial overlapping between the column data C1 and C2, C2 and C3, C3 and C4, C4 and C5, respectively. The first, the third, the fifth, the seventh and the ninth columns correspond to the restored five original data columns C1, C2, C3, C4, and C5 of the 5×5 data page. For the convenience of the description, the four additional column data is referred to as overlapped-column-data.

Generally, when the original data page consists of N column data, the restored data page can have a total of (2N−1) column data. The (N−1) columns represent the overlapped-column-data and the other N columns represent the original column data. Especially, if the original data page is a binary data page including binary data that are distinguished by values of "0" and "1" corresponding to the weak and the strong light intensities, respectively, the overlapped-column-data in the restored data page can be represented by ternary values of "0," "1," and "2" according to the light intensity. In this case the higher number represents the stronger light intensity. This results from the fact that the overlapped region has been illuminated twice as much during recording the data and the amount of change of the refractive index generated by the illumination can be twice as much also. Since the larger change of the refractive index diffracts light more strongly during restoring the data, the ternary value of "2" represents that two adjacent ON-pixels, bright pixels, have been overlapped during recording the column data. Similarly, the ternary value of "1" represents that one ON-pixel, bright pixel, and one OFF-pixel, dark pixel, have been overlapped and "0" represents that two OFF-pixels have been overlapped during recording the data.

The color recognition of the original data page in FIG. 1 will be described as follows. The white color can indicate the strong light intensity, which corresponds to a binary value of "1," and the black color can indicate the weak light intensity, which corresponds to a binary value of "0." When these binary data is restored as in the odd columns of FIG. 2, the restored binary value of "1" is represented by gray pixel and "0" by dark pixel. The white pixel in FIG. 2 represents the brightest light and the ternary value of "2"

For example, the overlapped-column-data located in the second column of the restored data page in FIG. 2, which is represented as [gray, black, white, gray, gray] from the top to the bottom, indicates that the column has pixel data of [1, 0, 2, 1, 1]. This is because the overlapped-column-data located in the second column is formed by the partial overlapping of the column data C1 and C2 of the original data page, which correspond to the binary data [1, 0, 1, 0, 1] and [0, 0, 1, 1, 0], respectively. Similarly, the overlapped-column-data located in the eighth column of the restored data page has the ternary values of [gray (1), gray (1), white (2), black (0), gray (1)] from the top to the bottom, which results from the partial overlapping of the binary column data C4 and C5, corresponding to [1, 0, 1, 0, 1] and [0, 1, 1, 0, 0], respectively. In this example, the partial overlapping of two binary data of "1" results in a ternary data of "2".

When the aforementioned data recording method in accordance with an embodiment of the present invention is applied to the holography optical memory system, the original column data of the original data page and the overlapped-column-data, which are recorded between the original column data, can be restored together in an expanded two-dimensional data page. The overlapped-column-data of ternary values can be used to check and correct the possible errors that may occur in the original column data during recording and restoring processes. For example, if the ternary value of a pixel in the restored overlapped-column-data is "2," it means that both of the adjacent data located at the left and the right sides must be the binary value of "1." If the ternary value is "1," either the left or the right binary data must be "1" and the other be "0". Similarly, if the ternary value is "0," both the left and right binary data must be "0". Accordingly, the precision of restoring the original binary data can be greatly improved in accordance with an embodiment of the present invention.

Hitherto, the method of sequentially recording the one-dimensional "column data" of the original data page, one at a time, has been described with reference to FIG. 1 and FIG. 2. The method, however, is a mere example. The data recording method according to an embodiment of the present invention can obviously employ a method of sequentially recording one-dimensional "row data" of the original data page, one at a time. At this time, there may appear additional overlapped-row-data in the restored data page.

In the above, the case that the original data page is the binary data page having the binary data has been described (hereinafter, the same is applied). This, however, does not limit an embodiment of the present invention. Alternatively, each pixel data of the original data page can be represented by three gray levels or more for distinguishing light intensities. This can be possible because recording multiple holograms in exactly the same area is an additive operation and the photo detector can detect multiple gray levels.

Hitherto, the data recording method in accordance with an embodiment of the present invention has been described in detail. A data recording method in accordance with another embodiment of the present invention will be described below. At this time, the overlapped description will be omitted.

FIG. 3A through FIG. 3D show how data is recorded in a holography optical memory system in accordance with another embodiment of the present invention. The data recording method in accordance with another embodiment of the present invention can also provide the method for recording a two-dimensional pixel data page as a hologram in a recording medium.

In accordance with the aforementioned embodiment of the present invention, the data recording method has employed the method of recording the "one-dimensional pixel data lines" (refer to the "column data" of the above example, and the same is used hereinafter) one at a time. However, the data recording method according to another embodiment of the present invention can employ a different recording method. The data recording method according to another embodiment of the present invention employs two-step process instead of multiple-step process of the above.

Before the recording, the one-dimensional pixel data lines of the original data page are divided into two groups and each group of the pixel data lines is arranged in different sub data pages of the same size. Then, the two sub data pages are sequentially recorded by using the same reference beam. In this case, the signal beam carrying the sub data page is incident into the same area of the recording medium in the same direction regardless of the sub data page such that the columns of the first and the second sub data pages exactly overlap in the recording medium. Since the data recording method according to another embodiment of the present invention does not employ the sequential scanning method as in the aforementioned embodiment of the present invention, it is not necessary to mount a scanner in an optical memory system in accordance with another embodiment of the present invention. Instead, it may be required to have a two-dimensional image forming apparatus to modulate the two-dimensional signal beam to carry the sub data page one at a time. The same can be applied to yet another embodiment of the present invention, which will be described by FIG. 4 through FIG. 6C.

In more detail, the data recording method in accordance with another embodiment of the present invention will be described below with reference to FIG. 3A through FIG. 3D.

Figure 3A:
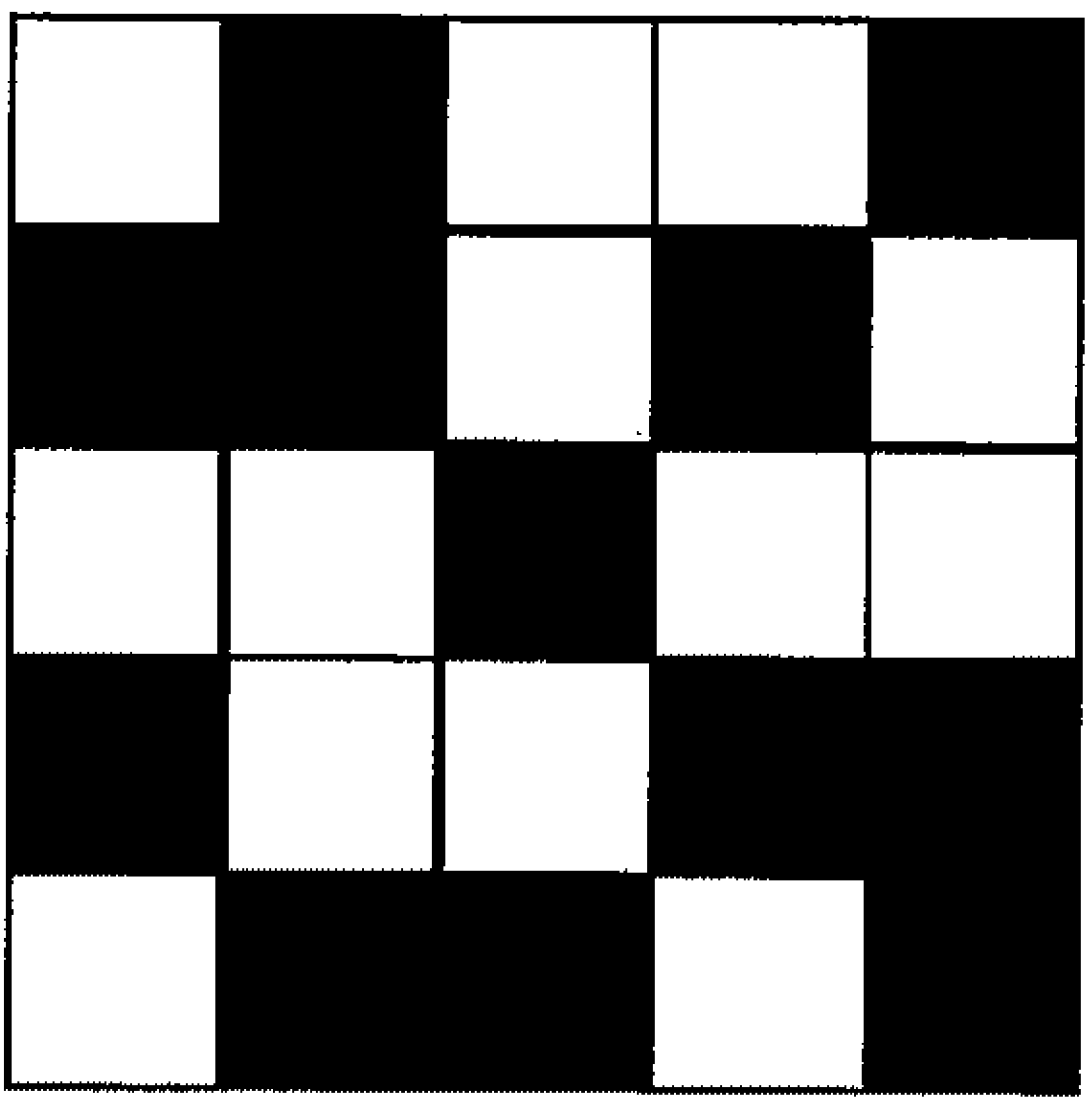

FIG. 3A shows an original data page that is designed to be recorded in a recording medium, which is identical to the original data page shown in the lower middle part in FIG. 1. That is, the original data page in FIG. 3A is a 5×5 matrix-type binary data page, having a total of five column data C1 through C5.

FIG. 3B and FIG. 3C show two sub data pages, where the odd numbered column data C1, C3, and C5 of the original data page are arranged in FIG. 3B and the even-numbered column data C2 and C4 of the original data page are arranged in FIG. 3C. In this case, a column data of the original data page can be arranged in the corresponding sub data page such that it can occupy three columns. In this specific example, the column data at the edges of the original data page are arranged in the corresponding sub data pages such that they can occupy two columns but this does not limit the data recording method according to another embodiment of the present invention. The size of the two sub data pages can be identically determined, a 5×9 matrix shape in this example.

The above example will be described in detail with reference to FIG. 3B and FIG. 3C as follows. The column data C1, C3, and C5 located at the odd-numbered columns of the original data page can belong to the first group and be arranged in the first sub data page as shown in FIG. 3B. In this case, the column data C1 can be horizontally expanded and located over the first and the second columns of the sub data page, the column data C3 over the fourth, the fifth and the sixth columns, and the column data C5 over the eighth and the ninth columns. Similarly, the column data C2 and C4 located at the even-numbered columns of the original data page can belong to the second group and be arranged in the second sub data page as shown in FIG. 3B. In this case, the column data C2 can be horizontally expanded and inserted into the second through the fourth columns of the sub data page, and the column data C4 into the sixth through the eighth columns of the sub data page. In addition to these arrangements, dummy-column-data having predetermined data values can be inserted between these column data in the sub data pages (i.e. the third and the seventh columns in FIG. 3B and the first, the fifth, and the ninth columns in FIG. 3C). FIG. 3B and FIG. 3C show that the dummy-column-data has the binary value of "0." However, the dummy-column-data can obviously have other values or a predetermined pattern of digital values.

In the data recording method in accordance with another embodiment of the present invention, the two sub data pages are recorded in exactly the same area of the recording medium due to the signal and the reference beams that are fixed in space during the recording. Because the two sub data pages are exactly overlapped in the recording medium, they can be restored by the same reference beam on a photo detector exactly overlapped with each other. Therefore, the expanded column data C1 and C2, C2 and C3, C3 and C4, and C4 and C5 can be overlapped in the second, the fourth, the sixth, and the eighth columns, respectively, in the overlapped sub data pages, or the restored data page. Here, these columns are referred to as the overlapped-column-data. In addition, the expanded column data C1, C2, C3, C4, and C5 can be overlapped with the dummy-column-data in the first, the third, the fifth, the seventh, and the ninth columns, respectively, in the overlapped sub data pages, or restored data page. There columns are referred to as the non-overlapped-column-data.

Figure 3D:
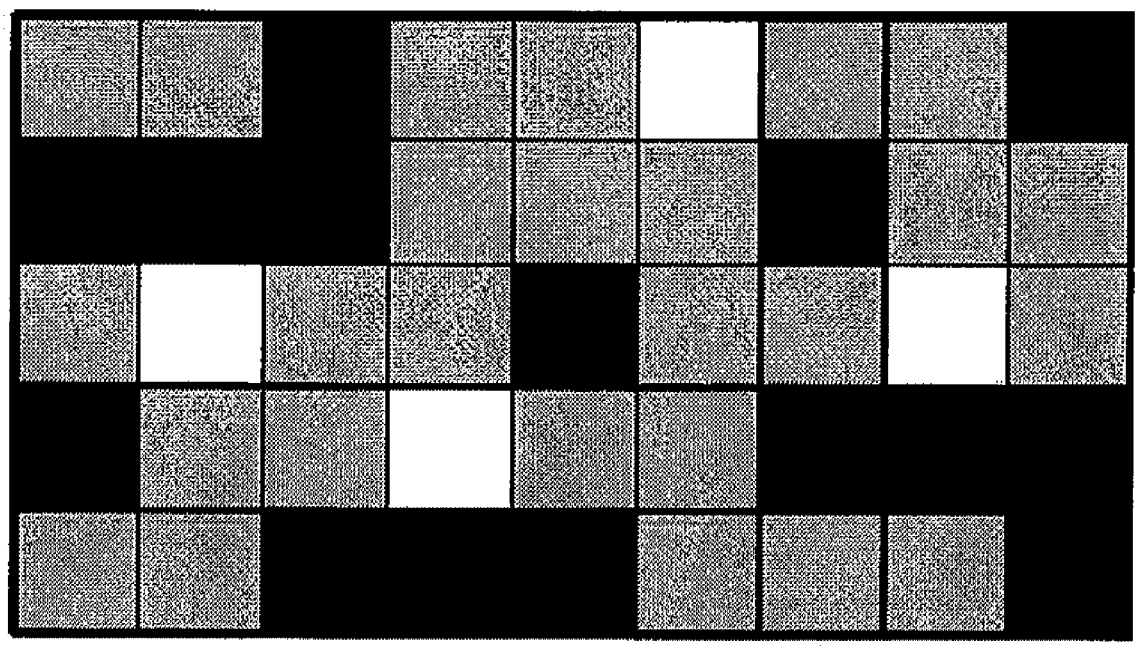

FIG. 3D shows the restored data page, which is identical to FIG. 2. This is because the two embodiments related to FIG. 2 and FIG. 3D employ the same principle of the partial overlapping between the adjacent column data. If an origin data page is a binary data page, the overlapped-column-data of the restored data page can be represented by ternary values.

The non-overlapped-column-data is formed by the expanded column data C1, C2, C3, C4, and C5 and the dummy-column-data overlapping at the first, the third, the fifth, the seventh, and the ninth columns in the restored data page, respectively, as shown in FIG. 3D. If all the dummy-column-data have the binary value of "0", the original column data can be recorded without any disturbance and then restored with the identical pixel data. In addition, if the overlapped-column-data is retrieved from the restored data page shown in FIG. 3D, it is possible to check and correct the possible errors that may arise during recording and/or restoring the data page in the holography optical memory system in accordance with the data recoding method according to another embodiment of the present invention. The basic principle of error detection and correction using the parity bit has been described in the above. Accordingly, the detailed description will be omitted.

Hereinafter, a data recording method of a holography optical memory system in accordance with yet another embodiment of the present invention will be described with reference to FIG. 4A through FIG. 6C.

Similarly to the data recording method described with reference to FIG. 3A through FIG. 3D, the data recording method in accordance with yet another embodiment of the present invention can employ the method of reconfiguring an original data page to two sub data pages according to a predetermined rule and then sequentially recording the two sub data pages in a recording medium by using a same reference beam.

The data recording method in accordance with yet another embodiment of the present invention can have the following differences in the method of reconfiguring the original data page to two sub data pages from that of the data recording method described with reference to FIG. 3A through FIG. 3D.

For example, in accordance with the data recording method according to another embodiment of the present invention, the "column data" of the original data page has been divided into two groups and the original data page has been reconfigured in two sub data pages such that the "column data" of the same group is arranged in the same sub data page per group. On the other hand, in accordance with the data recording method according to yet another embodiment of the present invention, the individual "pixel data" of the original data page is divided into two groups and they are reconfigured in two sub data pages such that the individual "pixel data" of the same group is included in the same sub data page per group. This will be described with reference to FIG. 4A through FIG. 6B by using detailed examples.

For the convenience of description, it is assumed that the original data page according to yet another embodiment of the present invention has a 5×5 matrix-type binary data page identical to that of FIG. 3A. In this case, there are a total of 25 pixel data, from D11 to D55 (refer to the left table of FIG. 5) in the original data page, and the binary value of the pixel data is shown in the right table of FIG. 5.

Figure 4A:
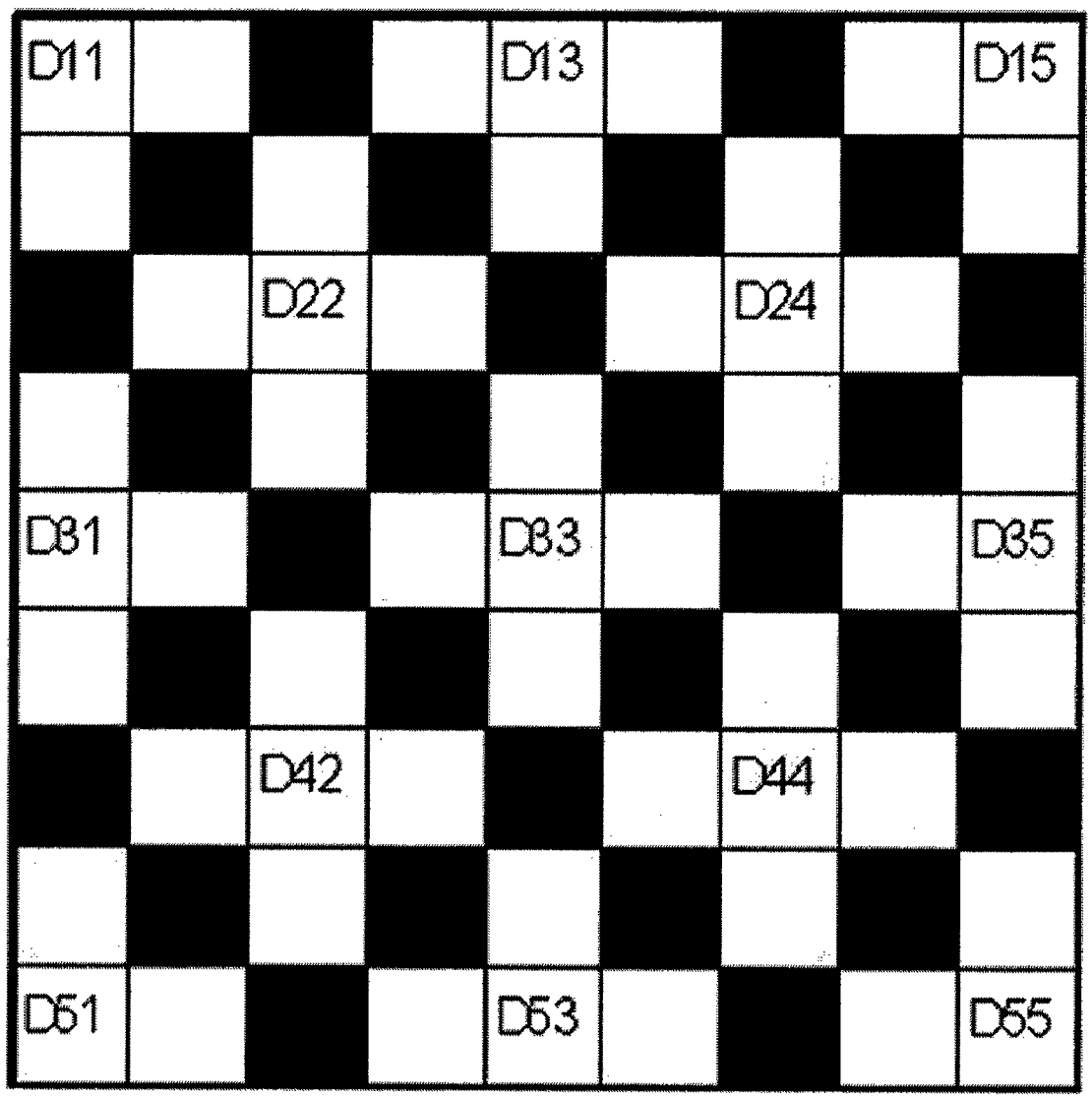
FIG. 4A and FIG. 4B show two sub data pages, respectively, to which a 5×5 matrix-type data page is reconfigured, on the basis of a data recording method in a holography optical memory system in accordance with yet another embodiment of the present invention.
Figure 4B:
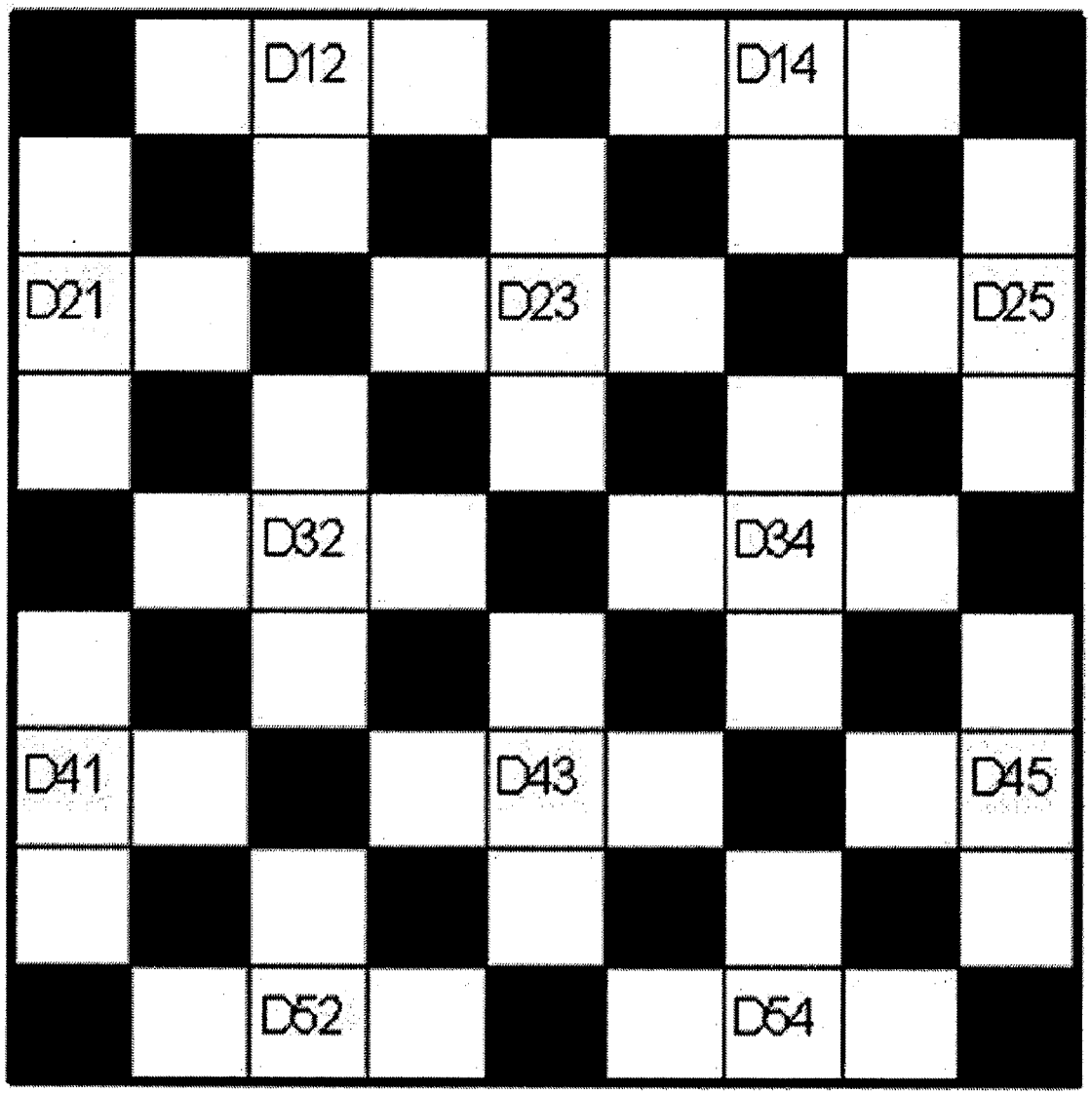

FIG. 4A and FIG. 4B show examples of two sub data pages in which the original data page in the left of FIG. 5 is reconfigured in accordance with yet another embodiment of the present invention. In particular, FIG. 4A shows the first sub data page in which a total of 13 pixel data D11, D13, D22, . . . , and D55 located at the intersection of the ith row and the jth column with i+j being an even number in the original data page is reconfigured. In this case, for example, the pixel data D24 that is located at the intersection of the 2nd row and the 4th column of the original data page of FIG. 5 is reconfigured in the sub data page of FIG. 4A such that it occupies 5 pixels arranged in a cross shape, the five white squares centered at the intersection of the 3rd row and the 7th column of FIG. 4A. However, the pixel data D11, D31, D15 and so on that are located at the edges or corners of the original data page are reconfigured in the sub data page such that they occupy 3 or 4 pixels in an incomplete, or a broken, cross. Similarly, FIG. 4B shows the second sub data page in which a total of 12 pixel data D12, D21, . . . , D45, and D54 located at the intersection of the ith row and the jth column with i+j being an odd number in the original data page is reconfigured. Similarly as above, a pixel data occupies multiple pixels in the sub data page. FIG. 4A and FIG. 4B show the two sub data pages when all the pixel data in the original data page is given by a binary value of "1" corresponding to the bright pixel. The black squares in FIG. 4A and FIG. 4B represent unused pixels, which may be used for other purposes.

The pixel data in the original data page can be reconfigured in the two sub data pages according to the following rule in accordance with yet another embodiment of the present invention. Firstly, the size of the two sub data pages can be determined to be identical to each other. Because the two sub data pages are sequentially recorded by using the signal and the reference beams that are fixed in space during the recording process, the two sub data pages are completely overlapped with each other in the recording medium and therefore a pixel data reconfigured in the shape of a cross, in general, in a sub data page can be partially overlapped with other pixel data in the other sub data page. There can be three different types of overlaps in the overlapped sub data pages: overlapped-pixel-data, non-overlapped-pixel-data and unused-pixel-data.

Hereinafter, the "unused-pixel-data," "overlapped-pixel-data," and "non-overlapped-pixel-data" will be described in more detail with FIG. 4A through FIG. 6B. When the two sub data pages are sequentially recorded and therefore exactly overlapped in the recording medium, one of the unused pixels, the black square in FIG. 4A and FIG. 4B, in one of the sub data pages can overlap with another in the other sub data page. These pixels in the overlapped sub data pages, or the restored page, are called "unused-pixel-data" and they are shown by x-mark in the right of FIG. 6A through FIG. 6C. A predetermined dummy data can be inserted into unused pixels of the sub data pages. Here, the predetermined dummy data of "0" is used in this embodiment of the present invention.

When the two sub data pages are overlapped, a pixel data in the shape of a cross, in general, in one sub data page can partially overlap with another in the other sub data page. The partial overlap occurs at a single pixel of the sub data page, or at one square. These pixels in the overlapped sub data pages are called "overlapped-pixel-data".

Similarly, when the two sub data pages are overlapped, a pixel data in the shape of a cross, in general, in one sub data page can overlap with an unused pixel in the other sub data page. The overlap occurs at a single pixel of the sub data page, or at one square. These pixels in the overlapped sub data pages are called "non-overlapped-pixel-data".

Figure 6A:
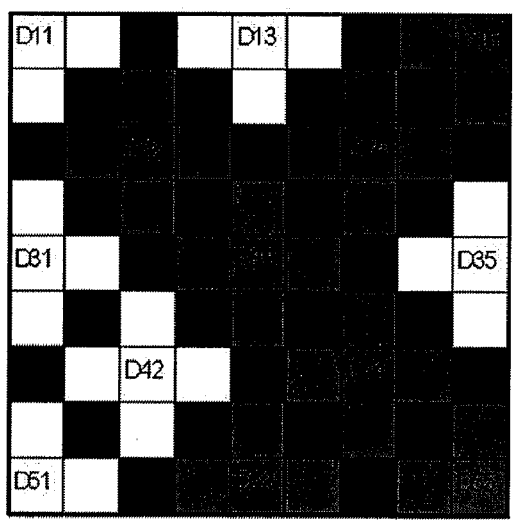
FIG. 6A and FIG. 6B show one and the other, respectively, of two sub data pages to which the 5×5 matrix-type data page shown in FIG. 5 is reconfigured.
Figure 6B:
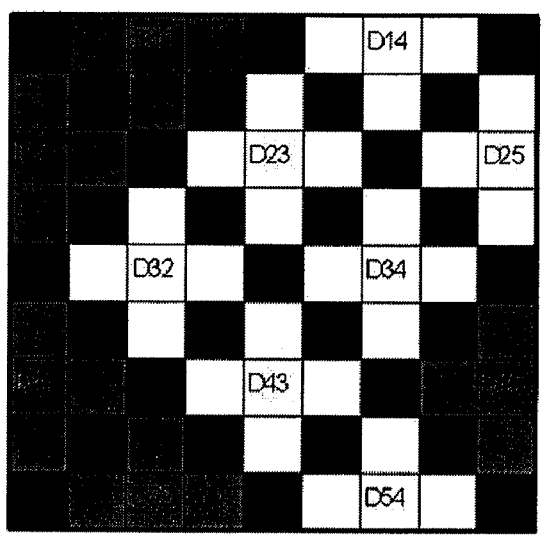

Because the non-overlapped-pixel-data is generated by an original pixel data and an unused dummy pixel, it contains the information of the original pixel data in the restored data page. On the other hand, because the overlapped-pixel-data is generated by a partial overlap of two adjacent pixel data in the overlapped sub data pages, it can be used as a parity check between the two pixel data. Because a pixel data in the original data page is reconfigured to be the shape of a cross, in general, in the sub data page, a pixel data can be partially overlapped with the maximum of four adjacent pixel data. FIG. 6A and FIG. 6B show actual examples that the original data page shown in the right of FIG. 5 is reconfigured in the two sub data pages. Here, two sub data pages shown in FIG. 6A and FIG. 6B are generated using the original data page and the two templates shown in FIG. 4A and FIG. 4B, respectively.

In FIG. 6A and FIG. 6B, black squares indicate the unused pixels to which a dummy data (i.e. a binary value of "0" in this embodiment of the present invention) is assigned, which do not necessarily become the "unused-pixel-data" in the overlapped sub data pages. Gray squares indicate the pixel data, reconfigured in the shape of a cross, having a binary value of "0". For example, because the pixel data D22 is given by a binary value of 0 in the original data page, the cross centered at the intersection of the 3rd row and the 3rd column in the sub data page FIG. 6A are assigned with binary values of 0. In this example, the black and the gray squares identically represent the binary data of 0. Different colors are for mere explanations. Similarly, white squares indicate the pixel data, reconfigured in the shape of a cross, having a binary value of "1"

Figure 6C:
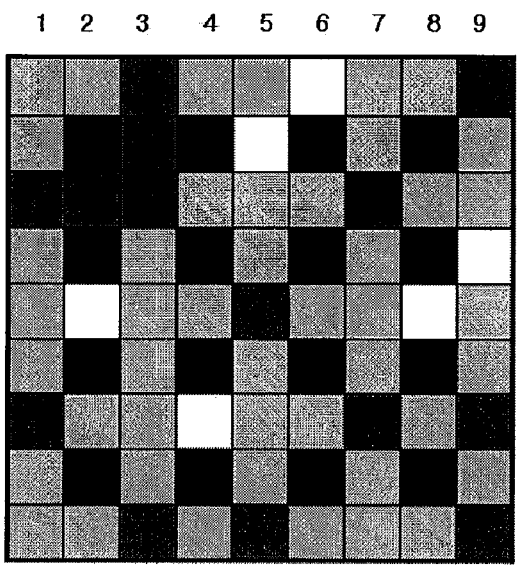
FIG. 6C shows a restored data page from the data that has been recorded on a recording medium such that signal beams corresponding to the two sub data pages shown in FIG. 6A and FIG. 6B are overlapped to each other.

FIG. 6C shows the restored data page, in which the two sub data pages are restored exactly overlapped. Black squares represent unused-pixel-data in which unused pixels of the two sub data pages are overlapped. They are marked by "x" in the right table and represent the weakest light intensity because the unused pixels in the sub data pages are assigned by a binary value of 0, or weak light. Dark-gray squares represent either the overlapped-pixel-data or non-overlapped-pixeldata. However, in any case, they are generated by an overlap of two pixels with the same binary value of 0. They also represent the weakest light intensity the same as the black square, or the ternary value of "0". Light-gray squares also represent either the overlapped-pixel-data or non-overlapped-pixel-data. However, in any case, they are generated by an overlap of two pixels, one with binary value 0 and the other with binary value 1. Therefore, they represent medium light intensity, or a ternary value of "1". White squares represent overlapped-pixel-data, which is generated by two pixels with the same binary value of 1. They represent the brightest light intensity, or a ternary value of "2". In the restored data page, the overlapped-pixel-data contains the parity data between two adjacent pixel data. They are shown by dotted squares in the right of FIG. 6C. For example, the parity data formed by the overlapping of the pixel data D22 with four adjacent pixel data D21, D12, D23, and D32 can be located at (3,2), (2,3), (3,4), and (4,3) matrix elements of FIG. 6C, respectively. Accordingly, the data recording method in accordance with yet another embodiment of the present invention can also check and correct the possible error arising during recording and/or restoring data page. Especially, one pixel data can be overlapped with the maximum of four other pixel data, except for the pixel data located at the edges or the corners of the original data page, in the data recording method in accordance with yet another embodiment of the present invention shown in FIG. 4A through FIG. 6C. Therefore, checking and correcting the possible errors can be done more precisely than in the two aforementioned embodiments of the present invention.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A data recording method in a holography optical memory system, for recording a two-dimensional pixel data page in a recording medium, the method comprising:
    dividing pixel data included in the pixel data page into two groups and reconfiguring the pixel data in two separate sub data pages such that pixel data of a same group are arranged in a same sub data page; and
    recording sequentially two signal beams corresponding to each sub data page in the recording medium by using a reference beam such that a pixel data is partially overlapped with adjacent multiple pixel data,
    wherein the pixel data is reconfigured in two sub data pages such that a pixel data in one sub data page is partially overlapped with other pixel data in the other sub data page when the two sub data pages are completely overlapped.

2. The method of claim 1, wherein the pixel data page has an M×N matrix shape, M and N being natural numbers equal to or greater than 2, and
    the pixel data is divided into two groups, a first group having the pixel data located at a $i^{th}$ row and a $j^{th}$ column with i+j being an odd number, and a second group having the pixel data located at a $i^{th}$ row and a $j^{th}$ column with i+j being an even number, and the two groups are reconfigured in two separate sub data pages.

3. The method of claim 1, wherein the two sub data pages have the same page size, and
    the pixel data is grouped and reconfigured in the two sub data pages such that there exist overlapped-pixel-data formed in an area where a pixel data is overlapped with adjacent another pixel data, non-overlapped-pixel-data formed in an area where a pixel data is not overlapped with other pixel data, and unused-pixel-data formed in an area where no pixel data is involved, or unused pixels of the two sub data pages are overlapped, when the two sub data pages are overlapped completely.

4. The method of claim 3, wherein predetermined dummy data is inserted in the unused pixel of the two sub data pages.

5. The method of claim 3, wherein the non-overlapped-pixel-data is formed by an overlap of a pixel data in one sub data page with an unused pixel having the dummy data in the other sub data page.

6. The method of claim 5, wherein the recording medium is distinguished into two areas to which the overlapped-pixel-data and the non-overlapped-pixel-data are stored, respectively, and
    modified pixel data is contained in the non-overlapped-pixel-data, which is formed by an overlap between the corresponding pixel data and the unused pixel with dummy data, and parity data is contained in the overlapped-pixel-data, which is formed by a partial overlap between two pixel data.

7. The method of claim 6, wherein, if the original pixel data of the pixel data page has a binary value that is distinguished as "1" and "0" according to light intensities,
    the parity data is represented by a ternary value according to light intensities.

8. The method of claim 6, wherein the dummy data has binary values distinguished as "0" and "1" according to light intensities, and the modified pixel data contained in the non-overlapped-pixel-data is represented by ternary values according to light intensities.

9. The method of claim 8, wherein all data values of the dummy data are "0."

10. The method of claim 1, wherein a pixel data is reconfigured in the shape of a cross in the corresponding sub data page such that the same data value is copied to five pixels: the center and the four neighboring pixels that are the left, right, upper and lower pixel, and different pixel data having a cross shape are arranged not to be overlapped in the same sub data page.

11. The method of claim 10, wherein reconfigured pixel data has the shape of a broken cross at the edge or the corner of the sub data page.

* * * * *